United States Patent
Cohen

(10) Patent No.: US 6,263,352 B1
(45) Date of Patent: Jul. 17, 2001

(54) AUTOMATED WEB SITE CREATION USING TEMPLATE DRIVEN GENERATION OF ACTIVE SERVER PAGE APPLICATIONS

(75) Inventor: Michael A. Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/970,217

(22) Filed: Nov. 14, 1997

(51) Int. Cl.[7] .............................. G06F 17/21; G06F 15/16
(52) U.S. Cl. .......................... 707/513; 707/501; 709/203
(58) Field of Search .................................. 707/500–531; 709/200–232; 705/1–5, 26; 706/45–47; 345/326–338

(56) References Cited

U.S. PATENT DOCUMENTS 6,035,119 * 3/2000 Massena et al. ......................... 717/1
6,055,541 * 4/2000 Solecki et al. ....................... 707/103

* cited by examiner

Primary Examiner—Hosain T. Alam
Assistant Examiner—Alford W. Kindred
(74) Attorney, Agent, or Firm—Lee & Hayes, PLLC

(57) ABSTRACT

A computer-implemented system is designed to assist a merchant in setting up an electronic online storefront that is customized to the merchant's business, without requiring the merchant to program. The system employs a store builder wizard to guide a merchant through a series of questionnaires designed to extract information pertaining to the merchant's business. The system further employs a page generator to create active server pages (ASPs) that form the customized storefront. The page generator creates the active server pages from a set of templates that are generic to formation of an online storefront. The templates are written as an extension to the active server page technology in a combination of hypertext language and scripting language. The active server templates specify an additional, higher order scripting level that distinguishes a second level of code by a new delimiter. During creation of the storefront, the page generator reads each active server template file and converts it to a scripting program having executable lines of code derived from the higher-order level of instructions denoted by the new delimiters. The page generator then executes the scripting program using the merchant data as input to produce a customized set of active server pages. The resulting active server pages contain the hypertext language and the lower-order level of instructions in the scripting language denoted by the original delimiters. The active server pages are stored together to form an active server application customized to the merchant's storefront.

17 Claims, 7 Drawing Sheets

AUTOMATED WEB SITE CREATION USING TEMPLATE DRIVEN GENERATION OF ACTIVE SERVER PAGE APPLICATIONS

TECHNICAL FIELD

This invention relates to computer network servers, such as Internet servers. More particularly, the invention relates to sever operating systems that enable generation of active server page applications, which are used to support Web sites on the Internet, from active server templates.

BACKGROUND

Online commerce is experiencing dramatic growth in recent years. Merchants are developing sites on the World Wide Web (or simply "WWW" or "Web") at a rapid pace. With Web sites in place, consumers can access and order goods and/or services electronically over the Internet from the comfort of their own homes or offices. It is becoming fairly common for a consumer to browse a merchant's catalog online, select a product, place an order for the product, and pay for the product all electronically over the Internet.

Merchants want Web sites that are customized to their product line. Ideally, merchants might like to design their own Web site to create a desired shopping atmosphere suitable for their products and services. Unfortunately, most merchants do not have the technical expertise to create and maintain a Web site on the Internet. As a result, merchants typically hire independent consulting firms to create and/or manage Web sites on the merchants' behalf It would therefore be beneficial to design a system that permits a merchant to create its own Web site without requiring the merchant to possess software design and programming skills.

To aid the following discussion, it might prove useful to provide additional background information on how resources are formatted and rendered over the Internet. Resources available on the Internet are most commonly presented as hypertext. "Hypertext," also referred to as "hypermedia," is a metaphor for presenting information in which text, images, sounds, and actions become linked together in a complex, non-sequential Web of associations that permit a user to browse through related topics, regardless of the presented order of the topics. Hypertext content is widely used for navigation and information dissemination on the Web. A "Web browser" is normally used to retrieve and render hypertext content from the Web.

Hypertext content is commonly organized as documents with embedded control information. The embedded control information includes formatting specifications, indicating how a document is to be rendered by the Web browser. In addition, such control information can include links or "hyperlinks," which are symbols or instructions telling the Web browser where to find other related VWeb documents on the Internet.

Hypertext content is commonly written in a "markup language." "SGML" (Standard Generalized Markup Language) is one such hypertext language, defined formally as "a language for document representation that formalizes markup and frees it of system and processing dependencies." SGML is a language for describing the structure of documents and for describing a tagging scheme to delineate that structure within text.

For creating hypertext content, Web documents utilize a subset of SGML called "HTML" (Hypertext Markup Language). An HTML textual document can be thought of as plain text that contains formatting instructions in the form of HTML markup codes or "tags." Tags tell Web browsers how to render and print documents, and are also used to specify hyperlinks.

The following is a simple example of a portion of an HTML document containing a single hyperlink:

Microsoft has a Web page with the latest <A HREF= "HTTP://www.microsoft.com/upgrades"> upgrades</A> to its popular word processing program.

The angled brackets define hypertext tags. When rendered by a Web browser, the word "upgrades" would appear highlighted and/or underlined to the user, and the text within the angled brackets would not appear at all, as follows:

Microsoft has a Web page with the latest upgrades to its popular word processing program.

By clicking on the highlighted keyword "upgrades," the user can instruct the Web browser to activate the underlying URL. In this case, the underlying URL is to an HTTP (hypertext) document located at host computer "www.microsoft.com," having the file name "upgrades."

Hypertext usage is not limited to the Internet. Various multimedia applications utilize hypertext to allow users to navigate through different pieces of information content. For instance, an encyclopedia program might use hyperlinks to provide cross-references to related articles within an electronic encyclopedia. The same program might also use hyperlinks to specify remote information resources such as Web documents located on different computers.

Microsoft Corporation has recently introduced a technology referred to as "Active Server Pages." An active server page, or "ASP", allows a user to write Web pages using a combination of a hypertext language (e.g., HTML) and a scripting language, such as Visual Basic from Microsoft Corporation or Java™ from Sun Microsystems. As an example, the following ASP file contains scripting language to define the colors used in the web page for the background, hyperlinks, and text.

```
<HTML>
<BODY
   bgcolor=<%=Application("color_bgcolor")%>
   link=<%=Application ("color_link")%>
   text=<%=Application(("color_text")%>
>
<P>Colored text here.
</BODY>
</HTML>
```

The hypertext terms are set apart by the angled brackets "<" and ">" such as "<HTML>" and "<BODY>". The delimiters "<%" and "%>" denote the instructions in the scripting language. When the ASP file is read and rendered by a Web browser, the scripting instructions within the delimiters are executed to fill in the background color, link color, and text color. The result is a familiar hypertext document.

Active Server Pages are described in documentation available from Microsoft's Web site "www.microsoft.com", under the section Internet Information Services. This text is hereby incorporated by reference.

SUMMARY

This invention provides a computer-implemented system that enables a user to create a web site that is customized to the user's needs without requiring the user to program. As one particular example, the system is configured to assist a merchant in setting up an electronic online storefront that is customized to the merchant's business.

According to one aspect of this invention, the system employs a store builder wizard to guide a merchant through a series of questionnaires designed to extract information pertaining to the merchant's business. For example, the questionnaires might be written as a series of HTML documents that require the merchant to enter data concerning the business' address, inventory, pricing, preferred method of payment, and so forth. The answers to the questions are stored in a data file.

The system further employs a page generator to create active server pages (ASPs) that form the customized storefront. The page generator creates the active server pages from a set of templates that are generic to formation of online storefronts. The page generator uses the merchant data collected by the store builder wizard as input to the templates to thereby convert the templates to ASPs that are customized according to the merchant's input. The active server pages are stored together to form an active server application that supports the merchant's storefront. In this manner, the merchant merely enters data through a user-friendly wizard interface and a customized storefront is automatically created. The merchant is not required to have any programming skills.

According to another aspect of this invention, the templates are written as an extension to the active server page technology. The templates, which are referred to as "active server templates", are written in a combination of hypertext language and scripting language. The active server templates are thereby akin to active server pages. However, unlike ASPs, the active server templates specify an additional, higher order scripting level that distinguishes a second level of code by a new delimiter.

During creation of the storefront, the page generator reads an active server template file and converts it to a scripting program having executable lines of code derived from the higher-order level of instructions denoted by the new delimiters. The page generator then executes the scripting program using the merchant data as input to produce a customized active server page. The resulting active server page contains the hypertext language and the lower-order level of instructions in the scripting language denoted by the original delimiters.

In the described implementation, the store builder wizard and page generator are embodied in a server operating system that executes on a network server. The store builder wizard and page generator can be accessed remotely over the Internet using a Web browser. In this arrangement, the merchant can access the host network server and enter the merchant data. The host server creates a custom storefront from the merchant data, and thereafter manages the storefront on behalf of the merchant.

DETAILED DESCRIPTION

Web sites on the Internet are commonly formed from a set of one or more Web pages. Individual Web pages are typically configured as a hypertext document, such as an HTML document. As noted in the Background, a recent technology enables a Web page to be configured as an "active server page", or "ASP". An active server page is written in a combination of a hypertext language (e.g., HTML) and a scripting language, such as Visual Basic Script (or "VBS") or JScript from Microsoft Corporation, per, python, REXX, or tcl. When a browser requests an ASP, the scripting language is executed to produce a Web page in the form of a hypertext document that can be rendered by the browser.

One aspect of this invention concerns creation of Web pages that may be used in a Web site. More particularly, one inventive aspect pertains to a computer-implemented system that enables a user to input information pertaining to a Web site and then automatically generates a set of Web pages based upon the information. In the context of an online business, the system permits a merchant to create its own customized online storefront simply by inputting data pertaining to its business. The merchant needs no special programming skills to build the storefront.

At the heart of the site creating system is a page generation system that enables automatic production of Web pages using site-relevant data as input. The page generation system generates custom Web pages from templates that are generic to a variety of Web sites.

General Page Generation System

Figure 1:
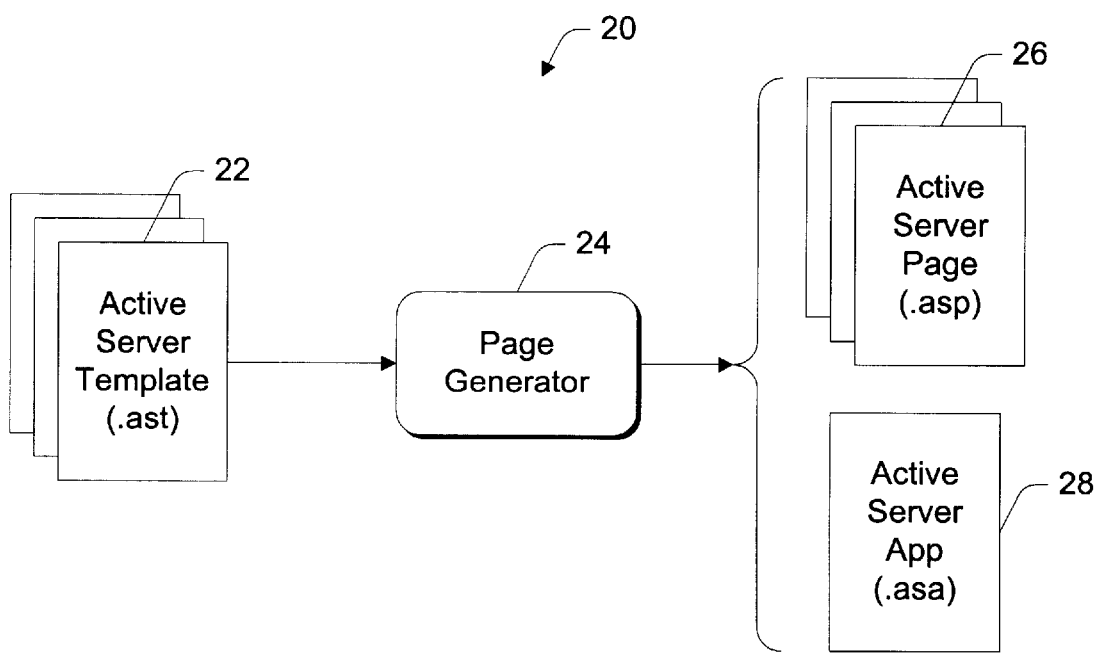
FIG. 1 is a diagrammatic illustration of a computer-implemented Web page generation system.

FIG. 1 shows a computer-implemented page generation system 20 that generates Web pages from templates. In the preferred implementation, the Web pages are written as active server pages. The page generation system 20 includes a library of templates 22 and a page generator 24 that converts one or more of the active server templates 22 into multiple active server pages 26 and an active server application 28. Together, the active server pages 26 (designated as ".asp") and the active server application 28 (designated as ".asa") form an ASP application, wherein each ASP application consists of a single global active server application 28 and multiple active server pages 26.

The templates 22 are written in a combination of hypertext language (e.g., HTML) and scripting language (e.g., VBS or JScript), which are the same two languages used in active server pages. The templates are referred to as "active server templates" or "ASTs". Unlike ASPs, however, the active server templates specify an additional, higher order scripting level that contain instructions denoted by a new delimiter pair "<%%" and "%%>". The new delimiters distinguish the higher order scripting level from the original, lower order scripting level that is denoted by the delimiter pair "<%" and "%>". Due to the different delimiters, the higher order scripting level can be executed independently of the lower order scripting level. Consider the following AST file:

```
<HTML>
<BODY
<%%if Item.SpecifyColors then%%>
   bgcolor=<%=Application("color_bgcolor")%>
   link=<%=Application("color_link")%>
   text=<%=Application("color_text")%>
<%% end if %%>
>
<P>Colored text here.
</BODY>
</HTML>
```

The AST file resembles the example ASP file described in the Background, except that it contains an additional level of scripting code in the form of an "if statement" set apart by the delimiters "<%%" and "%%>". The "if statement" can be executed separate from the original scripting code pertaining to color selection of the background, hyperlinks, and text, as denoted by the delimiters "<%" and "%>".

Figure 2:
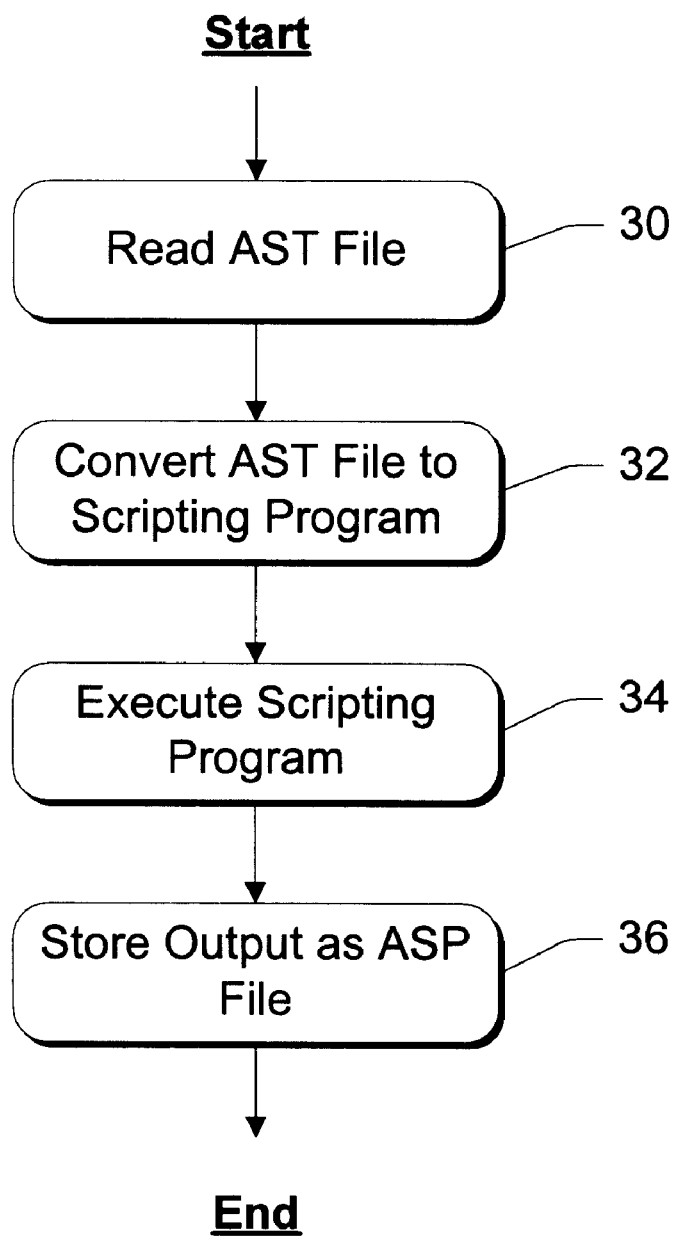
FIG. 2 is a flow diagram having steps in a method for transforming active server templates into active server pages.

FIG. 2 shows a method implemented in the page generator 24 to transform the active server template 22 into a corresponding active server page 26. At step 30, the page generator 24 reads the AST file from memory. The page generator 24 then converts the AST file to a scripting program (step 32). As one example, the page generator 24 turns every line in the AST file into a print statement, except the higher order lines of code surrounded by the "<%%" and "%%>" delimiters. The following scripting program is produced:

```
Print "<HTML>"
Print "<BODY"
if Item.SpecifyColors then
Print
   "bgcolor=<%=Application("color_bgcolor")%>"
Print "link=<%=Application("color_link")%>"
Print "text=<%=Application("color_text")%>"
end if
Print ">"
Print "<P>Colored text here."
Print "</BODY>"
Print "</HTML>"
```

At step 34, the page generator 24 executes the scripting program. The property "Item.SpecifyColors" is a data item that is input to the program. In the context of Web site generation, this property is obtained from the user. Assuming the property "Item.SpecifyColors" is true, executing the scripting program would yield the following output:

```
<HTML>
<BODY
   bgcolor=<%=Application("color_bgcolor")%>
   link=<%=Application("color_link")%>
   text=<%=Application("color_text")%>
>
<P>Colored text here.
</BODY>
</HTML>
```

This output is stored as an ASP file (step 36 in FIG. 2). The ASP file can later be retrieved and rendered to HTML by executing the lines of code denoted the "<%" and "%>" delimiters. The resulting HTML is then passed to a browser, which renders the HTML on the screen.

Exemplary Environment

For purpose of continuing discussion, the page generation system is described within an exemplary environment of online commerce. In this environment, a merchant desires to create an online storefront that is customized to its business. It is noted, however, that the page generation system of FIGS. 1 and 2 can be used in contexts other than the online commerce environment.

Figure 3:
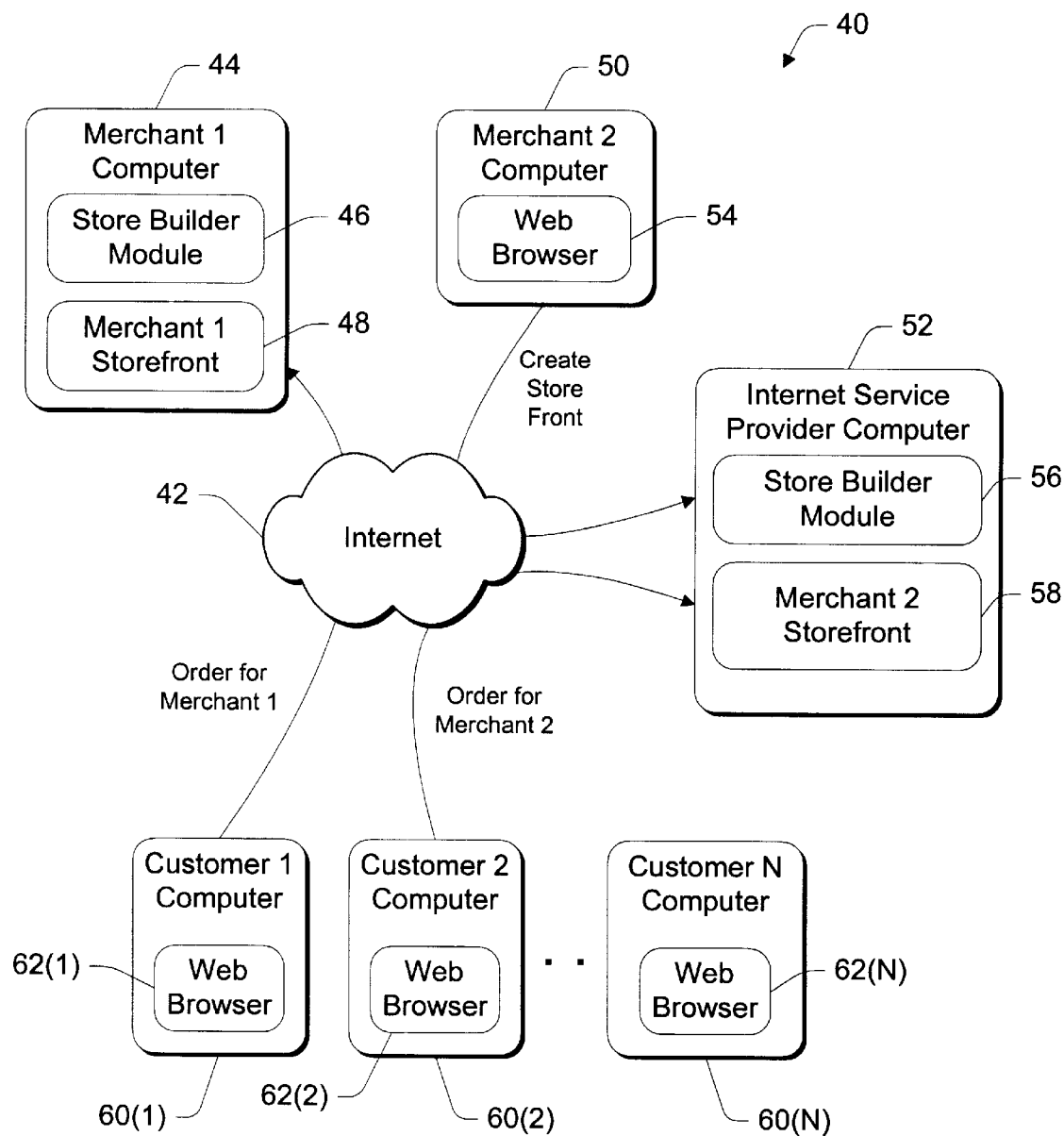
FIG. 3 shows an online commerce system as one possible environment in which the page generation system might be used to generate merchant storefronts.

FIG. 3 shows an online commerce system 40 in which customers shop for goods and services from merchants over the Internet 42. The online commerce system 40 exhibits two possible scenarios. One scenario is that the merchant creates and manages its own online storefront. Merchant 1 represents this case. A host computer 44, which resides at merchant 1, is loaded with a store builder module 46 that aids the merchant in creating an online storefront. The merchant enters data relevant to its business and the store builder module 46 generates a storefront 48 that is customized to the merchant's business based on the entered data. The merchant storefront 48 is kept and managed at the merchant's computer 44.

The second scenario is where a merchant has no expertise in managing an online storefront. Hence, the merchant relies on the expertise of an Internet Service Provider (ISP). Merchant computer 50 and ISP computer 52 represent this case. The ISP computer 52 is configured with the store builder module 56. The merchant uses a local Web browser 54 to remotely access the store builder module 56 on the ISP computer 56 to enter data pertaining to the merchant's business. The store builder module 56 creates a merchant's storefront 58 based on the data submitted by the merchant over the Internet 42. The storefront 58 is maintained at the ISP computer 52.

The customers access the storefronts electronically over the Internet 42 from their computers, as represented by customer computers 60(1), 60(2), . . . , 60(N). Each customer computer is configured with a Web browser 62(1), 62(2), . . . , 62(N). To shop and order goods from merchant 1, a customer (e.g., customer 1) uses his/her Web browser to access the merchant storefront 48 maintained on the merchant host computer 44. To shop and order goods from merchant 2, a customer (e.g., customer 2) uses the Web browser to access the merchant storefront 58 maintained on the ISP host computer 52.

Figure 4:
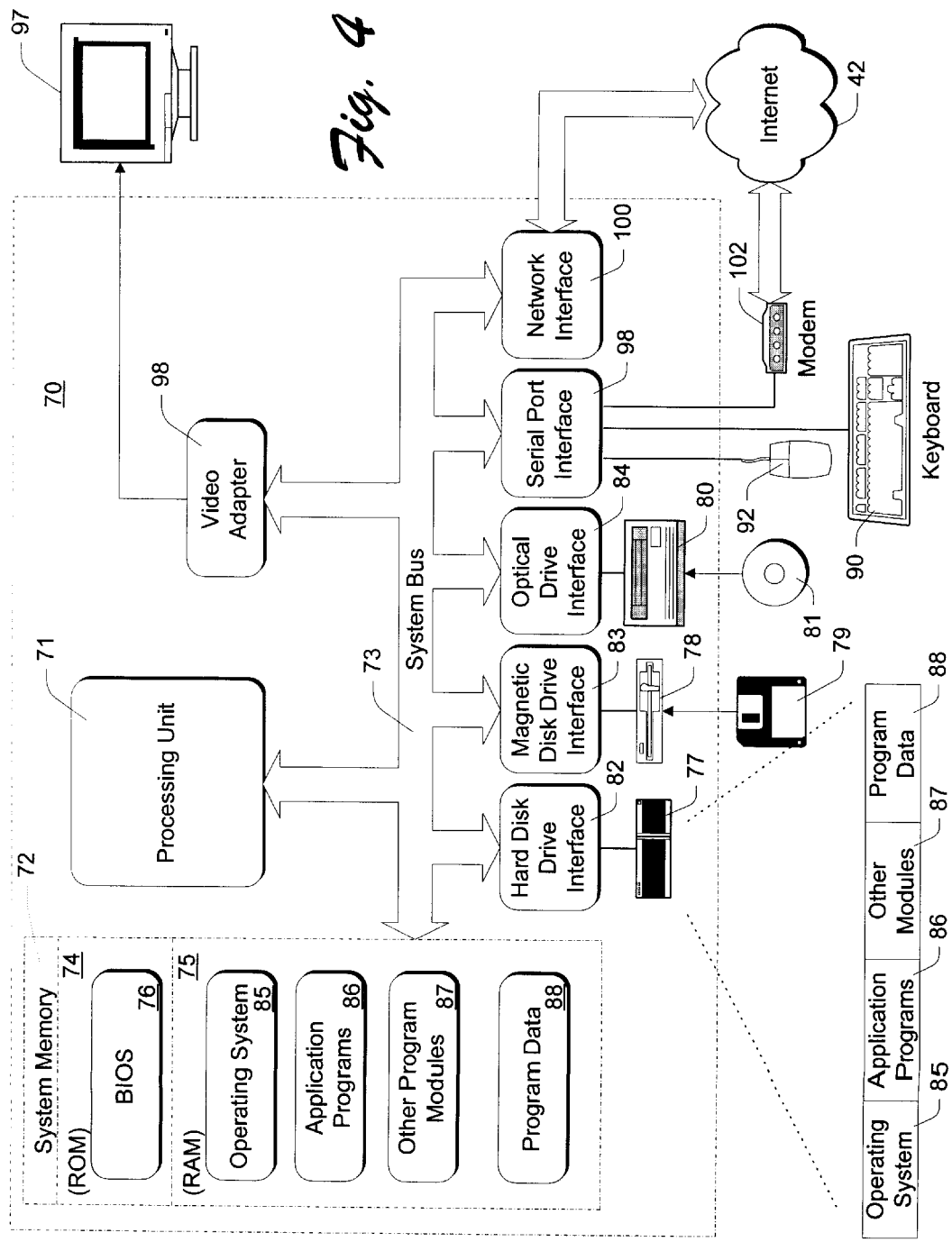
FIG. 4 shows a host computer that can be configured to implement the page generation system.

FIG. 4 shows an example implementation of a host computer, such as the merchant host computer 44 or the ISP host computer 52. The host computer is a general purpose computing device in the form of a conventional personal computer 70 that is configured to operate as a host network server. The server computer 70 includes a processing unit 71, a system memory 72, and a system bus 73 that couples various system components including the system memory 72 to the processing unit 71. The system bus 73 may be any of several types of bus structures including a memory bus or memory controller, a peripheral bus, and a local bus using any of a variety of bus architectures. The system memory 72 includes read only memory (ROM) 74 and random access memory (RAM) 75. A basic input/output system 76 (BIOS) is stored in ROM 74.

The server computer 70 also has one or more of the following drives: a hard disk drive 77 for reading from and writing to a hard disk, a magnetic disk drive 78 for reading from or writing to a removable magnetic disk 79, and an optical disk drive 80 for reading from or writing to a removable optical disk 81 such as a CD ROM or other optical media. The hard disk drive 77, magnetic disk drive 78, and optical disk drive 80 are connected to the system bus 73 by a hard disk drive interface 82, a magnetic disk drive interface 83, and an optical drive interface 84, respectively. The drives and their associated computer-readable media provide nonvolatile storage of computer readable instructions, data structures, program modules and other data for the personal computer 20.

Although a hard disk, a removable magnetic disk 29, and a removable optical disk 31 are described, it should be appreciated by those skilled in the art that other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 79, optical disk 81, ROM 74, or RAM 75. These programs include an operating system 85, one or more application programs 86, other program modules 87, and program data 88. A user may enter commands and information into the personal computer 70 through input devices such as keyboard 90 and pointing device 92. Other input devices (not shown) may include a microphone, joystick, game pad, satellite dish, scanner, or the like. These and other input devices are often connected to the processing unit 71 through a serial port interface 96 that is coupled to the system bus 73, but may be connected by other interfaces, such as a parallel port, game port, or a universal serial bus (USB). A monitor 97 or other type of display device is also connected to the system bus 73 via an interface, such as a video adapter 98. In addition to the monitor, personal computers typically include other peripheral output devices (not shown) such as speakers and printers.

The server computer 70 is connected to the Internet 42 through a network interface or adapter 100, a modem 102, or other means for establishing communications over the Internet. The modem 102, which may be internal or external, is connected to the system bus 73 via the serial port interface 96.

Figure 5:
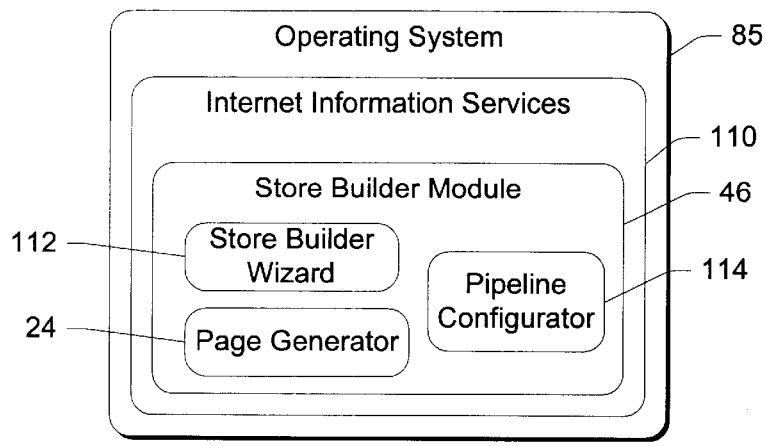
FIG. 5 is a block diagram showing the page generation system implemented in software as part of a server operating system on the host computer of FIG. 4.

FIG. 5 shows an exemplary implementation in which the store builder module 46 (or 56) is implemented within the operating system 85 on the host server computer 70. The server computer 70 runs a server operating system, which is preferably a Windows brand operating system from Microsoft Corporation. One preferred operating system is the Windows NT operating system. The operating system 85 includes an Internet Information Services component 110 that provides the functionality to support a wide variety of Internet services. The store builder module 46 is integrated into the Internet Information Services component 110. The store builder module 46 includes a store builder wizard 112, the page generator 24, and a pipeline configurator 114.

System Software Architecture

Figure 6:
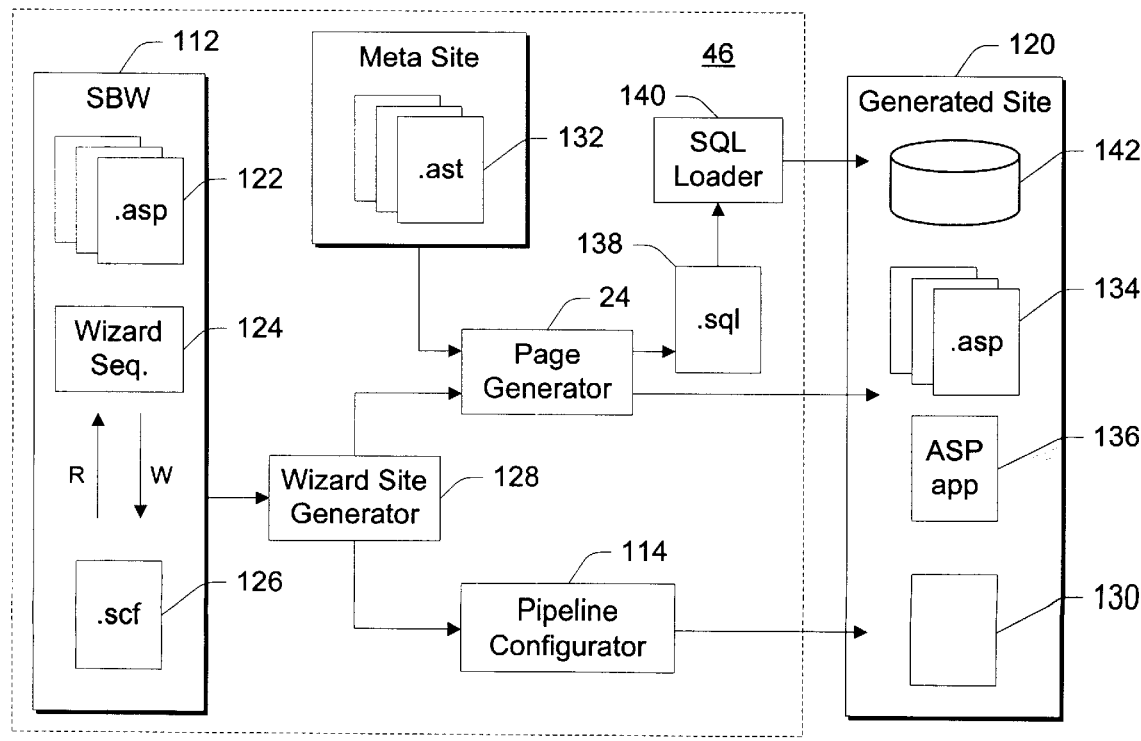
FIG. 6 shows a system software architecture for a store builder module that implements the page generation system used to build merchant storefronts.

FIG. 6 shows the general system software architecture for the store builder module 46, which takes input from a merchant and generates a customized Web site storefront 120. The store builder wizard (SBW) 112 guides a merchant through a series of step by step instructions for entering data pertaining to the merchant's business. In one implementation, the SBW 112 is configured as a set of active server pages 122 which are ordered by a sequencer 124 to present a series of user interface screens that ask various questions designed to extract information from the merchant. For instance, the ASPs 122 are transformed when rendered to a series of HTML documents that require the merchant to enter data concerning the business' address, inventory, pricing, preferred method of payment, and so forth.

Figure 7:
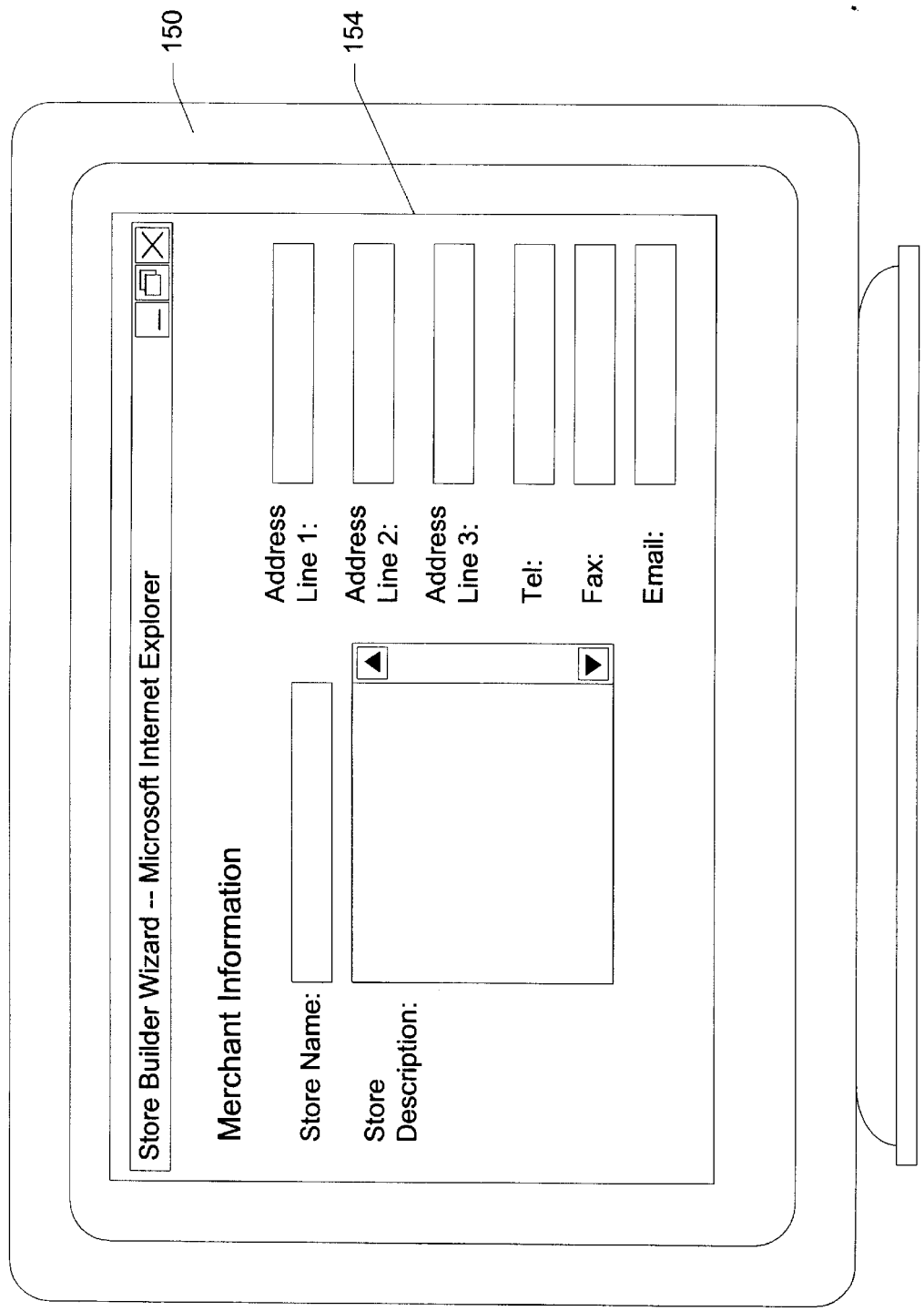
FIGS. 7 and 8 show examples of two wizard pages that guide a merchant through a series of questions to collect data pertaining to the merchant's business.
Figure 8:
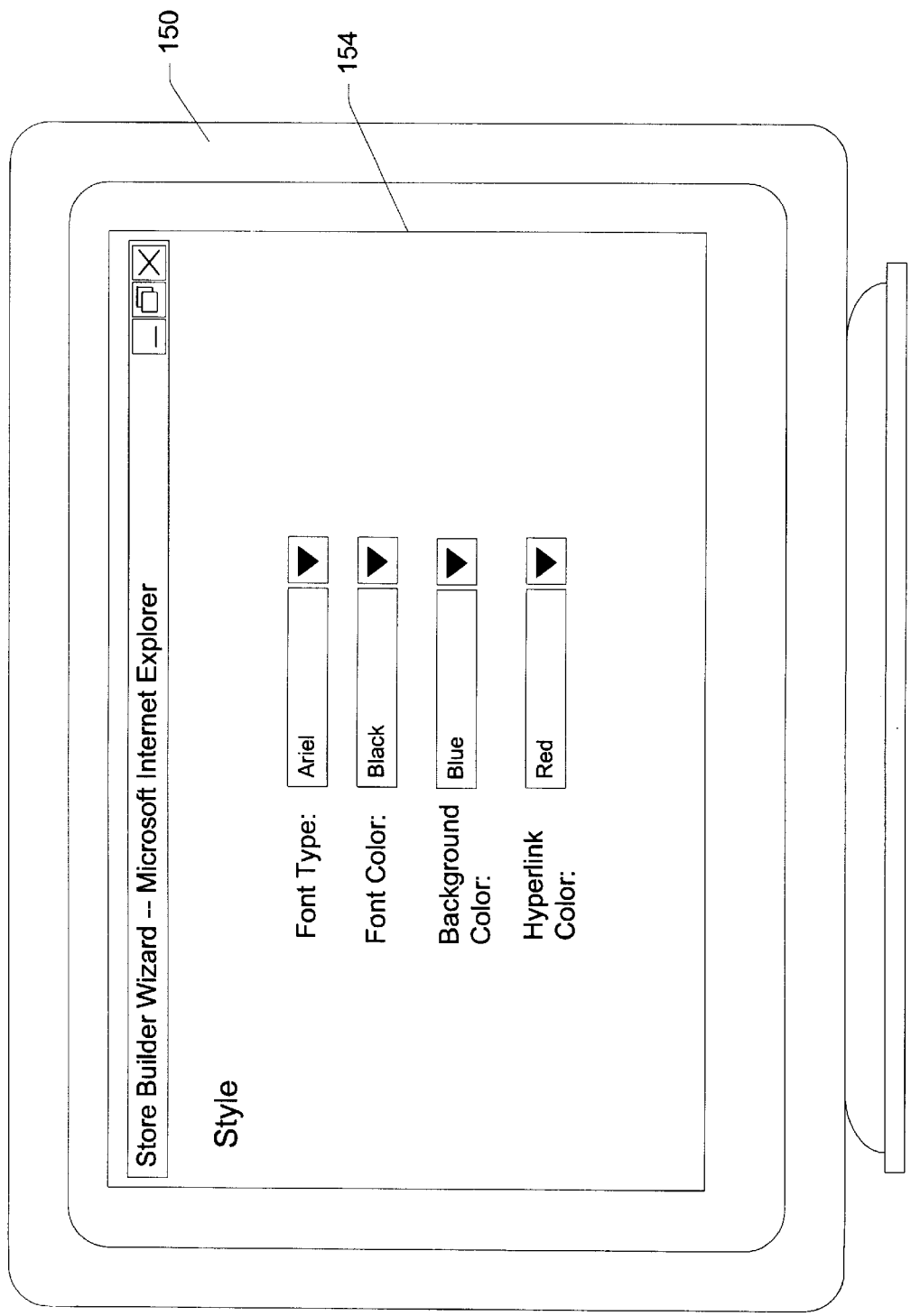

FIGS. 7 and 8 show examples of two SBW questionnaire pages shown on a display 150. FIG. 7 shows the "Merchant Information" page 152, which pertains to general information about the merchant, such as business name, address, and business description. When the merchant invokes the store builder wizard 112 (either locally on their own computer, or remotely via a browser), the "Merchant Information" page 152 is rendered and the merchant enters data into the fields.

FIG. 8 shows the "Style" page 154, which is directed to storefront properties, such as background color, font color, and hyperlink color. This page is presented in the sequence after the "Merchant Information" page 152 of FIG. 7. The merchant enters preferred color choices and continues onto the next page.

In addition to the two pages shown in FIGS. 7 and 8, there are many other possible types of pages. Examples of possible pages include a "Welcome" page that greets the merchant; a "Locale" page for entry of currency, language, taxes, and time; a "Product" page for defining a product line; a "Shipping and Handling" page for entry of preferred shipment techniques; a "Tax" page for entry of special taxes; and a "Payment Method" page for selection of preferred methods of payment.

With reference again to FIG. 6, the merchant's data entered to the SBW is collected and stored in a data file 126. The data file 126 is passed to a wizard site generator 128, which directs the data to the page generator 24 and the pipeline configurator 114. The pipeline configurator 114 establishes business rules concerning order processing and procedures for handling purchases. The rules are generated based on the merchant data collected by the SBW 112. The rules are stored in a data file 130 at the generated storefront 120.

The store builder module 46 includes a library of active server templates 132 that are generic for a variety of merchant storefronts. The page generator 24 reads the active server templates 132 and uses them to generate a set of one or more active server pages 134 and an active server application 136 while using the merchant data in the data file 126 as input to the templates. The generation of the ASPs 134 from the templates 132 and merchant data 126 is achieved in the same manner described above with reference to FIGS. 1 and 2.

The page generator 24 can also generate database-compatible files that might be used to store products and services available from the merchant. In this example, the page generator 24 creates a SQL file 138 that is compatible with SQL server database software from Microsoft Corporation. The SQL file 138 is loaded by loader 140 into a database 142 to serve as a product/service database supporting the merchant's storefront.

The store builder module also enables the merchant to make changes to their storefront without having to create an entirely new storefront. For instance, suppose the merchant wants to change the color of the background from blue to green. The merchant invokes the store builder wizard and sequences to the "Style" page 154 in FIG. 8. The merchant then changes the background field from "blue" to "green". This change is stored in the data file 126 and the page generator 24 generates a new ASP that reflects the background color change. Accordingly, the merchant can make occasional changes to its storefront, without needing the programming skills to directly modify the underlying pages.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented system comprising:

an active server template written in a combination of a hypertext language and a scripting language, the active server template having two levels of scripting language that are denoted by first and second delimiters; and a page generator to execute the active server template by executing one level of the scripting language denoted by the first delimiter to produce at least one active server page, the active server page containing the hypertext language and the other level of scripting language denoted by the second delimiter.

2. A computer-implemented system as recited in claim 1, further comprising an operating system embodied in a computer-readable medium, wherein the page generator is incorporated into the operating system.

3. A computer-readable program language embodied on a computer-readable medium comprising:

hypertext code for specifying hypertext terms; and scripting code for providing scripting functionality to form a hypertext page using the hypertext terms, the scripting code having first and second levels of instructions denoted by first and second delimiters whereupon execution of the scripting code's first level of instructions denoted by the first delimiter results in an executable structure containing the hypertext code and the scripting code's second level of instructions and subsequent execution of the scripting code's second level of instructions results in a renderable structure containing hypertext code.

4. A computer-readable program language as recited in claim 3, wherein the hypertext code comprises hypertext markup language (HTML).

5. A computer-readable template embodied on a computer-readable medium comprising:

hypertext terms that can be rendered by a browser; a first level of scripting code that upon execution yields a hypertext page having the hypertext terms, the first level of scripting code being denoted by a first delimiter; and a second level of scripting code that upon execution yields an active server page containing the hypertext terms and the first level of scripting code, the second level of scripting code being denoted by a second delimiter different from the first delimiter to enable execution of the second level of scripting code independent of the first level of scripting code.

6. A computer operating system embodied on a computer-readable medium, the operating system comprising a page generator to convert an active server template to an active server page that can be rendered by an Internet browser, the active server template being written in a combination of a hypertext language and a scripting language, the page generator converting the active server template to a scripting program and executing the scripting program to produce the active server page.

7. A computer operating system as recited in claim 6, whereby the scripting language of the active server template is configured with first and second levels of scripting language that are denoted by first and second delimiters, the page generator executing the first level of the scripting language denoted by the first delimiter to produce the active server page.

8. A computer operating system as recited in claim 6, whereby the scripting language of the active server template is configured with first and second levels of scripting language that are denoted by first and second delimiters, the page generator converting the first level of the scripting language denoted by the first delimiter to print statements that form the scripting program.

9. A method for creating a Web site comprising the following steps:

collecting data pertaining to the Web site;

reading one or more Web page templates that are generic for a variety of Web sites; and generating a set of one or more Web pages that form the Web site based on the site data and the set of generic Web page templates.

10. A method as recited in claim 9, wherein the Web page templates comprise active server templates, each active server template containing a hypertext language and a scripting language, the scripting language having first and second levels of instructions denoted by first and second delimiters, the step of generating comprises the following steps:

converting the active server templates to a scripting program having executable lines of code derived from the first level of instructions denoted by the first delimiters; and executing the scripting program to produce the Web pages, the Web pages containing the hypertext language and the second level of instructions in the scripting language denoted by the second delimiters.

11. A method as recited in claim 9, wherein the data collecting step comprises the step of presenting step by step instructions to a user for entering the data.

12. A method as recited in claim 9, wherein the data collecting step comprises the step of presenting a series of user interface screens that enable a user to respond to various questions, the responses being collected as the data.

13. A method as recited in claim 9, wherein the steps of collecting, reading, and generating are performed at a first computing location, and further comprising the step of submitting the data for collection from an online computing location that is connected to, but remote from, the first location.

14. A computer-readable medium comprising computer-executable instructions for performing the steps in the method as recited in claim 9.

15. A method for converting an active server template to an active server page, comprising the following steps:

reading a file containing the active server template, the active server template containing a hypertext language and a scripting language, the scripting language having first and second levels of instructions denoted by first and second delimiters;

converting the active server template file to a scripting program having executable lines of code derived from the first level of instructions denoted by the first delimiters; and executing the scripting program to produce an active server page containing the hypertext language and the second level of instructions in the scripting language denoted by the second delimiters.

16. A method as recited in claim 15, further comprising the step of storing the active server page in a data file.

17. A computer-readable medium comprising computer-executable instructions for performing the steps in the method as recited in claim 15.

* * * * *

UNITED STATES PATENT AND TRADEMARK OFFICE
CERTIFICATE OF CORRECTION

PATENT NO. : 6,263,352 B1
DATED : July 17, 2001
INVENTOR(S) : Michael A. Cohen

It is certified that error appears in the above-identified patent and that said Letters Patent is hereby corrected as shown below:

Column 1,
Line 56, change "Vweb" to -- Web --.

Column 7,
Line 24, change "gamc" to -- game --.

Signed and Sealed this

Twenty-ninth Day of January, 2002

*Attest:*

JAMES E. ROGAN
*Attesting Officer*  *Director of the United States Patent and Trademark Office*